United States Patent
Kita et al.

(10) Patent No.: US 10,906,116 B2
(45) Date of Patent: Feb. 2, 2021

(54) ARC WELDING SYSTEM AND ARC WELD DETERMINATION DEVICE

(71) Applicant: KABUSHIKI KAISHA YASKAWA DENKI, Kitakyushu (JP)

(72) Inventors: Hiroyuki Kita, Kitakyushu (JP); Masafumi Murakami, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 419 days.

(21) Appl. No.: 15/906,051

(22) Filed: Feb. 27, 2018

(65) Prior Publication Data

US 2018/0250763 A1    Sep. 6, 2018

(30) Foreign Application Priority Data

Mar. 3, 2017  (JP) .................. 2017-041151

(51) Int. Cl.
```
B23K 9/095     (2006.01)
B23K 9/00      (2006.01)
B23K 9/173     (2006.01)
B23K 31/12     (2006.01)
B23K 9/10      (2006.01)
B23K 101/00    (2006.01)
```
(52) U.S. Cl.
CPC .......... B23K 9/0953 (2013.01); B23K 9/0956 (2013.01); B23K 9/1006 (2013.01); B23K 9/173 (2013.01); B23K 31/125 (2013.01); B23K 2101/006 (2018.08)

(58) Field of Classification Search
CPC combination set(s) only.
See application file for complete search history.

(56) References Cited

U.S. PATENT DOCUMENTS

| | | | | | |
|---|---|---|---|---|---|
| 4,788,410 | A | * | 11/1988 | Grau | B23K 9/12 219/124.34 |
| 10,682,729 | B2 | * | 6/2020 | Witney | F01D 5/02 |
| 2010/0326962 | A1 | * | 12/2010 | Calla | B23K 9/0956 219/76.14 |

(Continued)

FOREIGN PATENT DOCUMENTS

| | | |
|---|---|---|
| JP | 3197100 U | 4/2015 |
| JP | 2016-26878 A | 2/2016 |
| WO | WO 2013/160745 A1 | 10/2013 |

OTHER PUBLICATIONS

Extended European Search Report dated Feb. 12, 2020 in European Patent Application No. 19203779.4, 9 pages.

(Continued)

*Primary Examiner* — David J Walczak
(74) *Attorney, Agent, or Firm* — Oblon, McClelland, Maier & Neustadt, L.L.P.

(57) ABSTRACT

An arc welding system includes an arc welding portion that executes an arc welding, an arc welding power supply that supplies a weld voltage and a weld current to the arc welding portion, an analyzer including analyzer circuitry that performs a frequency analysis on a time series waveform of at least one of the weld voltage and the weld current and generates frequency spectral data, and a determiner including determiner circuitry that obtains a welding state of a welding work by the arc welding portion based on the frequency spectral data generated by the analyzer.

20 Claims, 11 Drawing Sheets

(56) References Cited

U.S. PATENT DOCUMENTS

| | | |
|---|---|---|
| 2014/0012402 A1 | 1/2014 | Nishiyama et al. |
| 2017/0068234 A1 | 3/2017 | Yaoita et al. |
| 2018/0143606 A1 | 5/2018 | Kawanoue et al. |

OTHER PUBLICATIONS

Combined Chinese Office Action and Search Report dated Jan. 14, 2020 in Chinese Patent Application No. 20181015148.X (with English translation), 15 pages.

Office Action dated Oct. 11, 2019 in corresponding Japanese Patent Application No. 2017-041151 (with English Translation), 9 pages.

Chinese Office Action dated Jul. 14, 2020 in Chinese Patent Application No. 201810105148.X (with English translation), 14 pages.

\* cited by examiner

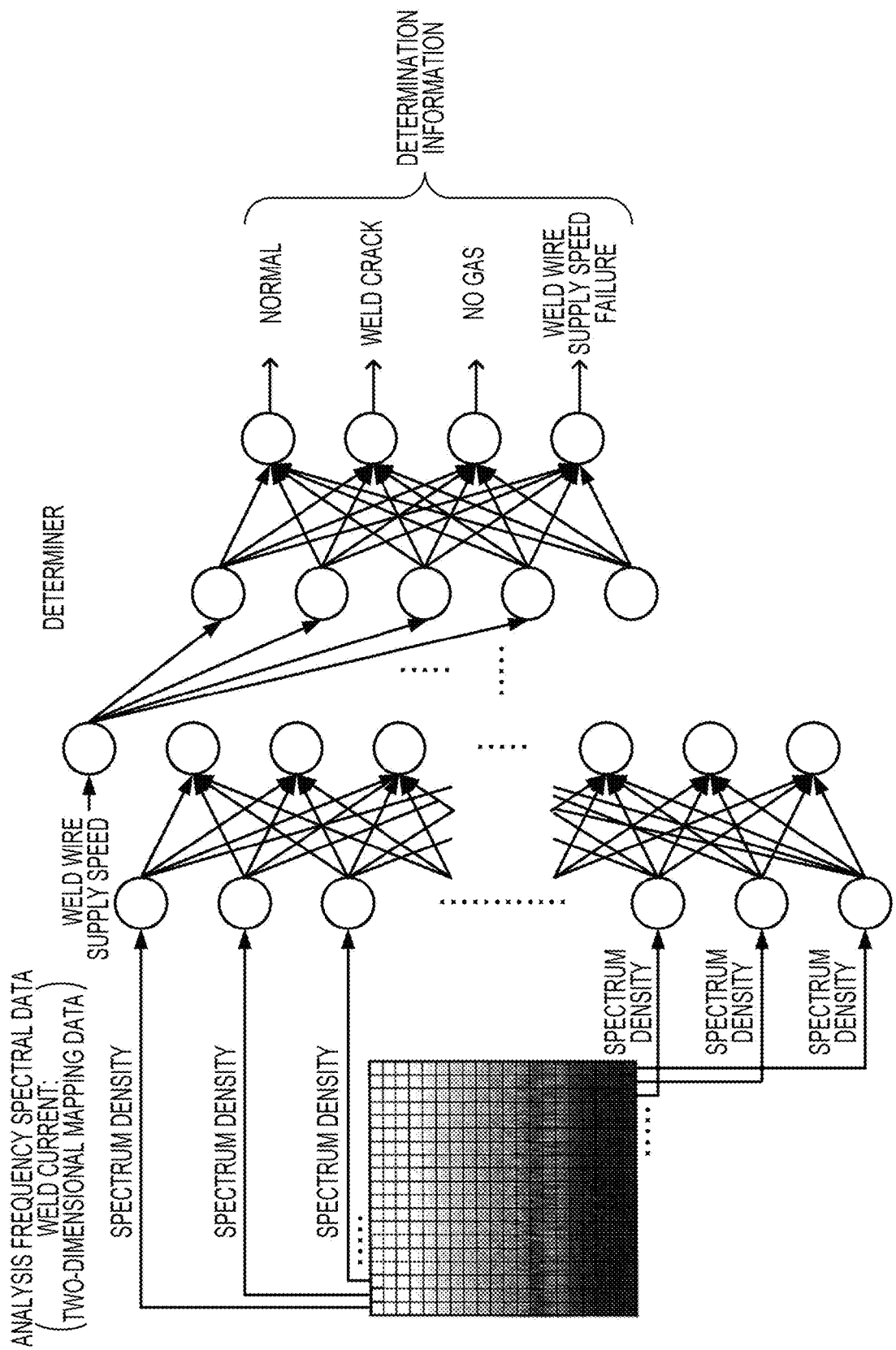

ARC WELDING SYSTEM AND ARC WELD DETERMINATION DEVICE

CROSS-REFERENCE TO RELATED APPLICATION

This application claims priority from Japanese Patent Application No. 2017-041151 filed with the Japan Patent Office on Mar. 3, 2017, the entire content of which is hereby incorporated by reference.

BACKGROUND

1. Technical Field

An embodiment of the present disclosure relates to an arc welding system and an arc weld determination device.

2. Description of the Related Art

A method described in Japanese Utility Model No. 3197100 determines a presence/absence of a weld failure by a statistical analyzation, such as obtaining an average, a dispersion, a standard deviation and the like of a weld parameter including an arc voltage, an arc current or the like.

SUMMARY

According to one aspect of the present invention, an arc welding system includes an arc welding portion that executes an arc welding, an arc welding power supply that supplies a weld voltage and a weld current to the arc welding portion, an analyzer including analyzer circuitry that performs a frequency analysis on a time series waveform of at least one of the weld voltage and the weld current and generates frequency spectral data, and a determiner including determiner circuitry that obtains a welding state of a welding work by the arc welding portion based on the frequency spectral data generated by the analyzer.

According to another aspect of the present invention, an arc weld determination device includes an analyzer including analyzer circuitry that performs a frequency analysis on a time series waveform of at least one of a weld voltage for an arc welding and a weld current for the arc welding and generates frequency spectral data, and a determiner including determiner circuitry that obtains a welding state of the arc welding based on the frequency spectral data generated by the analyzer circuitry of the analyzer.

BRIEF DESCRIPTION OF THE DRAWINGS

FIG. 11 illustrates a modification of a summary model structure of a neural network of a determiner that takes a weld wire supply speed into consideration when the deep learning is applied to the machine learning algorithm.

DESCRIPTION OF THE EMBODIMENTS

Figure 1:
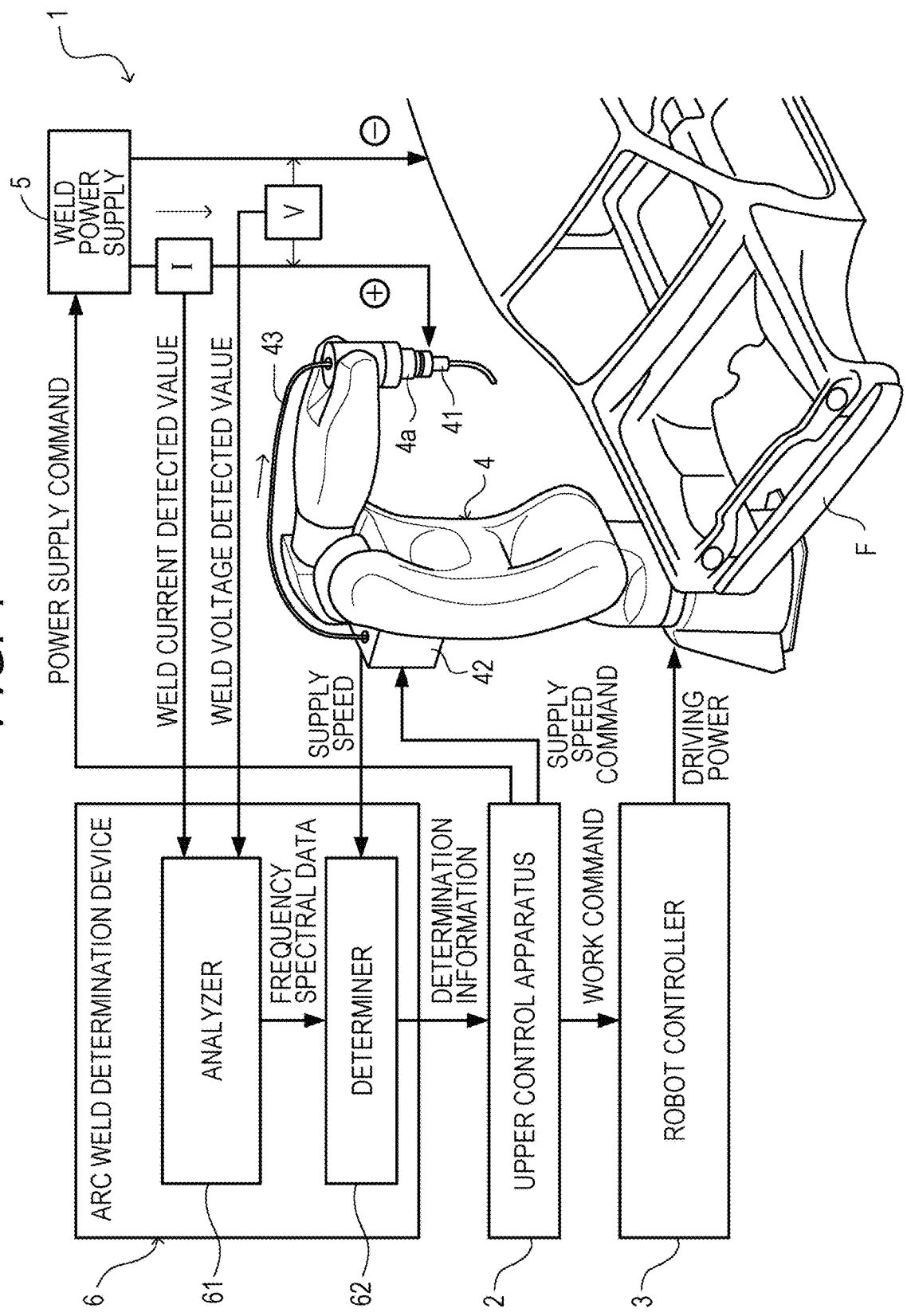
FIG. 1 is a drawing illustrating an exemplary schematic system block configuration of a robot arc welding system according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The following describes a first embodiment with reference to the drawings.

<Schematic Configuration of Robot Arc Welding System>

FIG. 1 illustrates an exemplary schematic system block configuration of a robot arc welding system 1 of the embodiment. This robot arc welding system 1 performs an arc welding along a predetermined welding line on a frame F of an automobile as an object. As illustrated in FIG. 1, the robot arc welding system 1 (an arc welding system) includes an upper control apparatus 2, a robot controller 3, a robot 4, a weld power supply 5, and an arc weld determination device 6. The example shown in the embodiment illustrates a case where the arc welding is performed with the frame F of the automobile as the object (a target workpiece). However, the target workpiece is not limited to a frame of an automobile. For example, the embodiment may be applied to an arc welding that uses, as a welding line, a seam joint and the like between members in a mechanical structure as a target workpiece.

The upper control apparatus 2 is constituted of, for example, a general-purpose personal computer that includes a CPU, a ROM, a RAM, an operating unit, a display and the like, which are not specifically illustrated. The upper control apparatus 2 manages an operation of the whole robot arc welding system 1. The upper control apparatus 2 specifically outputs a predetermined work command to the robot controller 3. The upper control apparatus 2 outputs a predetermined supply speed command to a weld wire supply unit included in the robot 4 and described below. The upper control apparatus 2 outputs a power supply command to the weld power supply 5 described below such that the weld power supply 5 outputs a predetermined weld electric power. Furthermore, the upper control apparatus 2 makes determinations regarding completion confirmation, interruption, and resume of an arc welding work based on weld information input from the arc weld determination device 6 described below.

The robot controller 3 performs a power supply control of a driving power that drivingly controls each of drive shaft motors (not illustrated) of the robot 4 so as to move a tip of an arc welding portion, which is described below, mounted on an arm tip portion 4*a* of the robot 4 along a predetermined welding line on the frame F based on the work command input from the upper control apparatus 2 described above.

The robot 4 is a manipulator arm (a six-axis robot) that includes six joint axes in the example of the embodiment illustrated. The arm tip portion 4*a* of the robot 4 includes an arc welding portion 41. The robot 4 drives each of the drive shaft motors with the driving power supplied from the above-described robot controller 3. This enables the robot 4 to control position and posture of the arc welding portion 41.

The arc welding portion 41 is an end effector. In this example, while continuously supplying a weld wire 43 as filler and a shield gas, the arc welding portion 41 performs a short circuiting welding to the frame F as a base material using the weld electric power supplied from the weld power supply 5 described below. The weld wire 43 is continuously supplied from a weld wire supply unit 42 included in the robot 4 similarly to the arc welding portion 41. This weld wire supply unit 42 supplies the weld wire 43 to the arc welding portion 41 at a supply speed based on the supply speed command input from the upper control apparatus 2. Furthermore, the weld wire supply unit 42 outputs the actually measured supply speed of the weld wire 43 to a determiner 62 of the arc weld determination device 6 described below. The robot 4 also includes a shield gas supply unit (not illustrated). The shield gas supply unit generates the shield gas based on a command from the upper control apparatus 2 and supplies the gas to the arc welding portion 41.

The weld power supply 5 (an arc welding power supply) converts an electric power supplied from a commercial power supply (not illustrated) to generate the weld electric power in accordance with the power supply command input from the upper control apparatus 2. The weld power supply 5 supplies the weld electric power between the arc welding portion 41 and the frame F. In the example illustrated, a DC power as the weld electric power is supplied between the arc welding portion 41 as a positive electrode side and the frame F as a negative electrode side. The weld power supply 5 outputs detected values of a weld current and a weld voltage actually supplied as a weld current detected value and a weld voltage detected value, respectively, to an analyzer 61 of the arc weld determination device 6 described below.

The arc weld determination device 6 determines a presence/absence of a weld failure (a failure of welding state) in a welding work performed with the arc welding portion 41 based on at least one of the weld current detected value and the weld voltage detected value used for the arc welding input from the above-described weld power supply 5. This arc weld determination device 6 includes the analyzer 61 and the determiner 62.

The analyzer 61 generates frequency spectral data by performing a frequency analysis on a time series waveform of at least one of the weld voltage and the weld current, the weld voltage and the weld current being used for the arc welding. That is, the analyzer 61 obtains time series waveform data by recording, in a time series, at least one of the weld current detected value and the weld voltage detected value of the power supplied from the weld power supply 5 to the arc welding portion 41. Furthermore, the analyzer 61 generates the frequency spectral data by performing the frequency analysis on this time series waveform data. Contents of an analysis method and the frequency spectral data by this analyzer 61 will be described in details later.

The determiner 62 is configured to receive the frequency spectral data to output a welding state obtained based on the frequency spectral data. That is, the determiner 62 obtains the welding state (a presence/absence of various kinds of weld failures and the like) corresponding to the frequency spectral data based on the frequency spectral data generated by the above-described analyzer 61. The determination method (obtaining method of the welding state) by this determiner 62 will be described in details later.

With the robot arc welding system 1 having the above-mentioned configuration ensures automatically executing the arc welding with respect to the welding line as a three-dimensionally various locus of the frame F of the automobile. Then, the arc weld determination device 6 can automatically determine the presence/absence of the weld failure of the frame F of the automobile. Furthermore, the upper control apparatus 2 can take measures to deal with the weld failure when the weld failure occurs.

Features of the Embodiment

In the arc welding system recently demanded, the arc welding portion mounted on the robot as described above is transported along the welding line (the seam joint) of the object and performs the arc welding. However, the arc welding is a considerably strict work. That is, in the arc welding, when various conditions fail to meet high criteria, a quality of the weld significantly deteriorates. The various conditions include, for example, an arranged state (such as an overlapping condition of the seam joint) of the object, a separation distance between the object and the filler (the weld wire 43 in this example), a supply state of the filler and/or the shield gas, and a temperature environment of the object. Therefore, it is important to obtain the welding state in the arc welding work with the robot.

The methods for determining the presence/absence of the weld failure that has been proposed up to the present performs a statistical analysis (that is, an analysis only by a time domain) that obtains averages, dispersions, standard deviations, and the like in a time series waveform itself of a weld voltage or a weld current supplied from the weld power supply to the arc welding portion. However, the time series waveform itself of the weld voltage and the weld current is susceptible to a noise caused by another factor. Therefore, the above-described method fails to sufficiently obtain detection accuracy of a subtle change in a waveform in order to determine a presence/absence of a weld failure depending on a type of the weld failure. Hence, it is difficult to determine the presence/absence of the weld failure that corresponds to the time series waveform.

In contrast to this, in the embodiment, the robot arc welding system 1 includes the analyzer 61 and the determiner 62. The analyzer 61 generates the frequency spectral data by performing the frequency analysis on the time series waveform of the weld voltage value or the weld current value detected by the weld power supply 5. The determiner 62 obtains the welding state of the welding work by the arc welding portion 41 based on the frequency spectral data generated by this analyzer 61. The welding state may include, for example, at least one of the presence/absence of the weld failure and a type of the occurred weld failure. The determiner 62 may be configured to output, for example, the obtained welding state as weld information. That is, the determiner 62 may determine the presence/absence of the weld failure based on the frequency spectral data and output the weld information including at least one of the determination result and the type of the occurred weld failure.

This also ensures performing a phase analysis on the time series waveform of the weld voltage or the weld current. Specifically, monitoring temporal variations of the frequency spectrum that relates to the weld failure in the frequency spectral data allows discriminating noises to ensure high failure determination accuracy.

The analyzer 61 and the determiner 62 are equivalent to an example of means for analyzing and means for determining of the present disclosure.

<Regarding Analysis Method by Analyzer>

Figure 2:
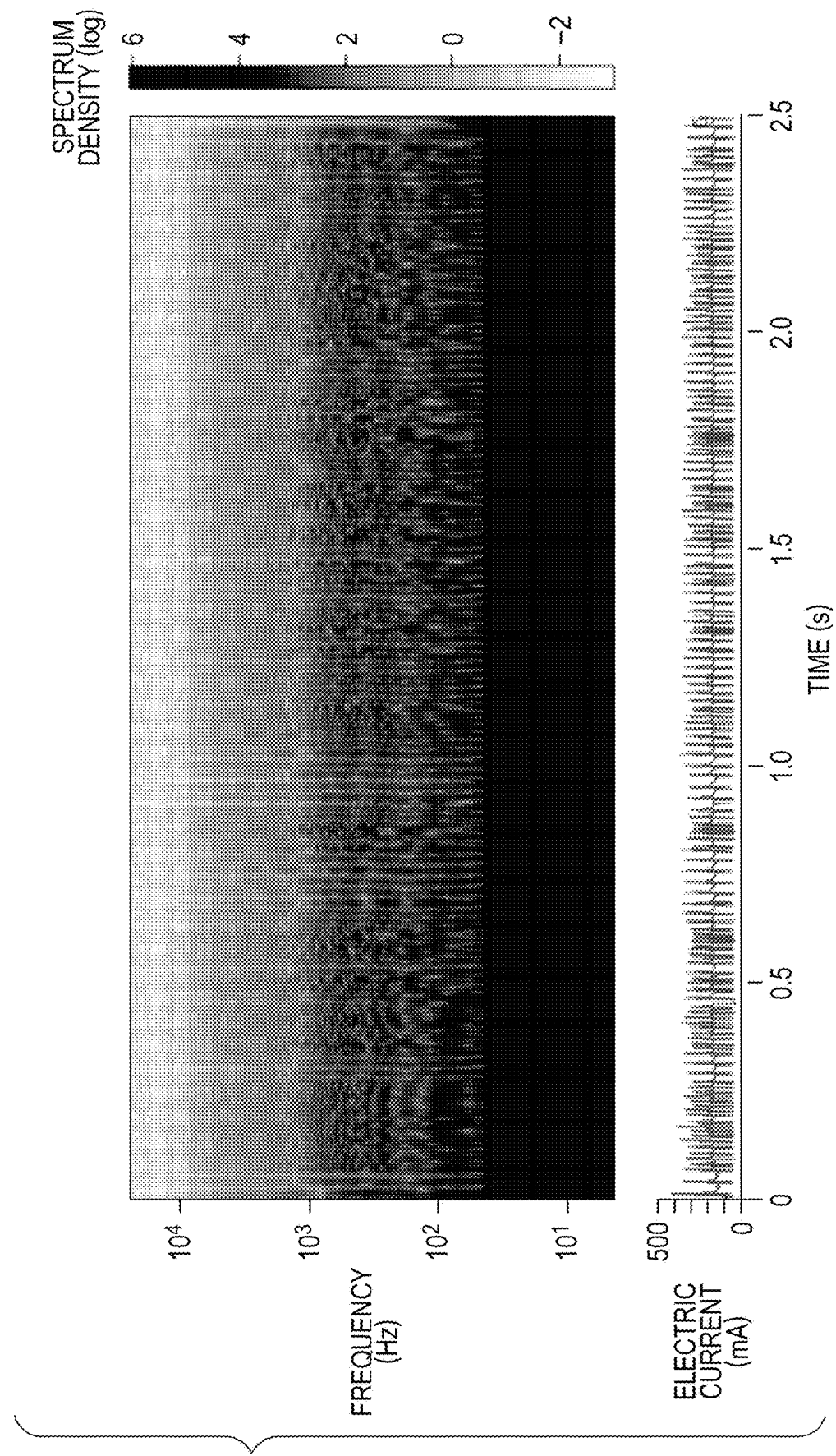
FIG. 2 illustrates an example of time series waveform data and frequency spectral data of a weld current when a normal welding is performed.
Figure 3:
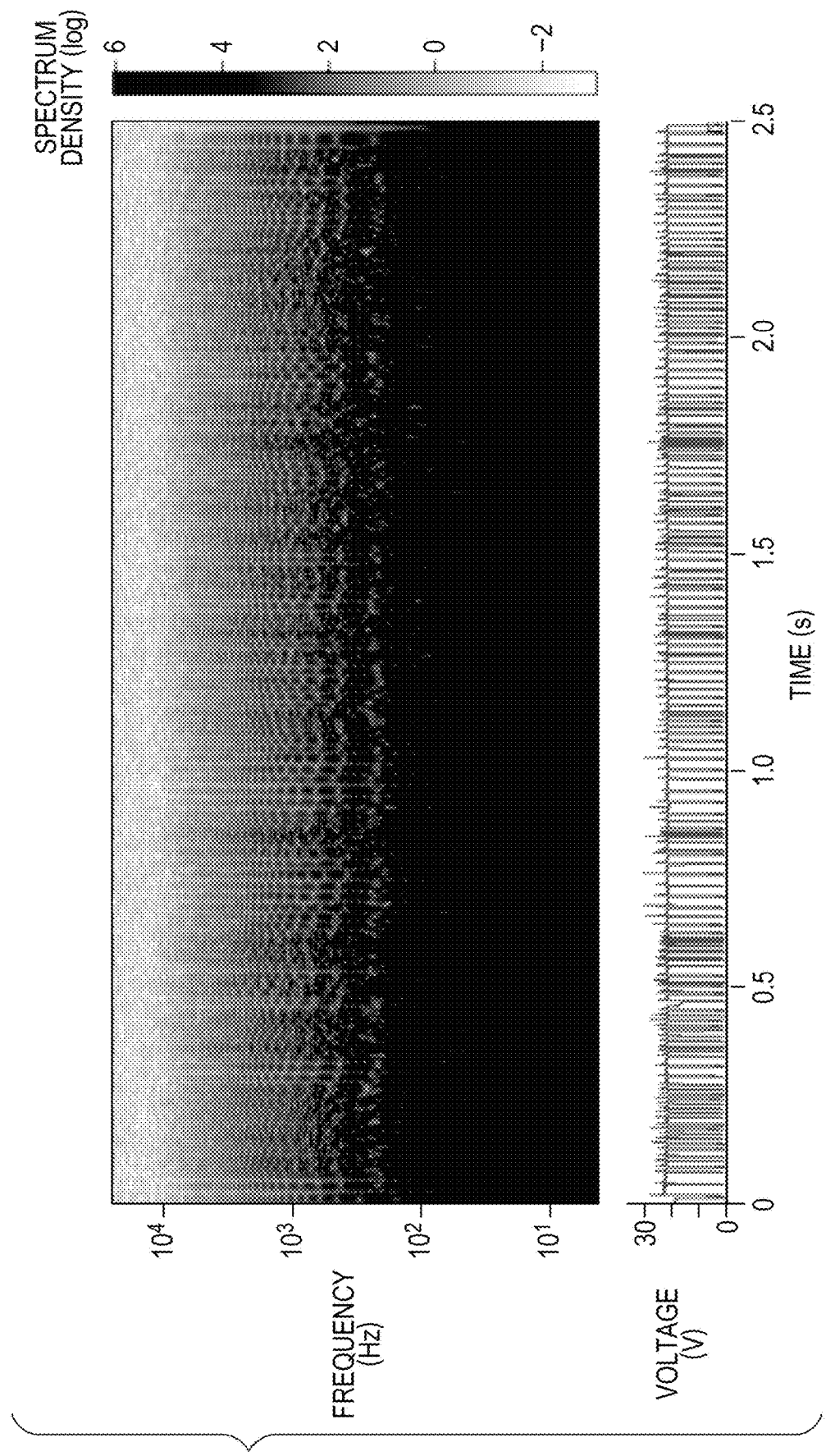
FIG. 3 illustrates an example of time series waveform data and frequency spectral data of a weld voltage when the normal welding is performed.

FIG. 2 illustrates an example of time series waveform data of a weld current when a normal welding is performed (when no weld failure substantially occurs and welding is normally performed) and frequency spectral data generated by the analyzer 61 based on this data. FIG. 3 illustrates an example of time series waveform data of a weld voltage when the normal welding is performed and frequency spectral data generated by the analyzer 61 based on this data. The time series waveform data illustrated in lower sides in these FIGS. 2 and 3 are obtained by recording, in a time series and in order, the weld current detected value or the weld voltage detected value detected at a predetermined sampling cycle during a stable stage after the arc welding portion 41 has started the welding work. In graphs indicating the respective time series waveform data, horizontal axes indicate time and vertical axes indicate weld current or weld voltage. It is understood that these waveforms are waveforms that repeat discharge approximately periodically.

However, in the arc welding work in the above-described short circuiting welding, a discharge phenomenon spontaneously occurs. Therefore, as can be seen from these drawings, discharge cycles and the respective cycle waveforms in the respective waveform data are not uniform and include large variations. Hence, there occur phase variations among the time series waveforms obtained by sampling at an identical cycle. Thus, it is difficult to obtain the frequency spectral data with which an accurate comparison can be made by individually performing the frequency analyses on these waveforms.

Figure 4:
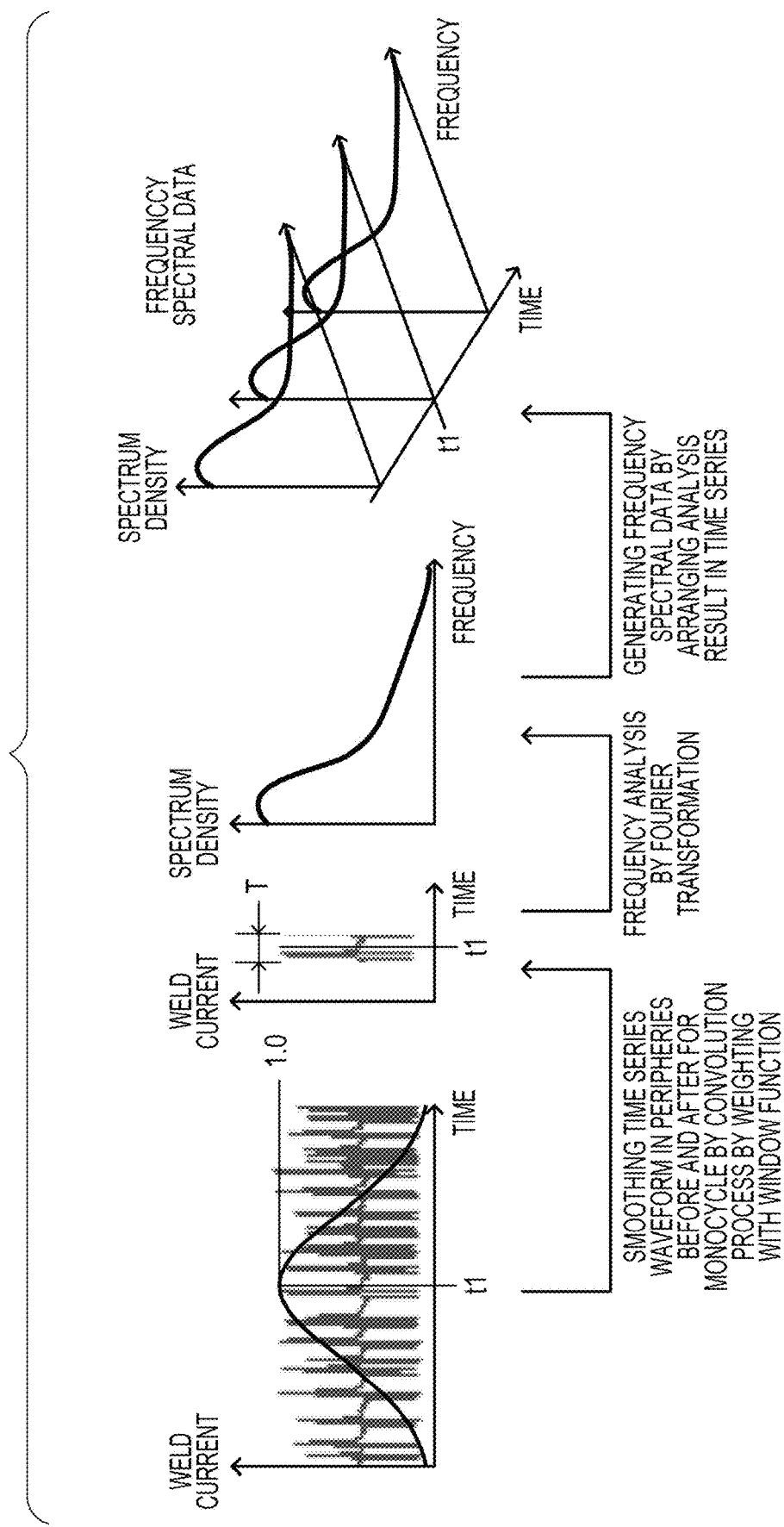
FIG. 4 is an explanatory view of a generation method of the frequency spectral data by the analyzer.

Therefore, in the embodiment, the analyzer 61 generates the frequency spectral data by an analysis method as illustrated in FIG. 4. That is, as illustrated in the drawing illustrated in the leftmost side in FIG. 4, when the frequency analysis at an arbitrary sampling time t1 on the time series waveform data is performed by the analyzer 61, the frequency analysis using an anti-aliasing filter is performed in order to reduce an aliasing error that possibly occurs when the sampling is performed. In other words, the analyzer 61 performs the frequency analysis on the waveform in which a power in a frequency bandwidth equal to or more than a Nyquist frequency corresponding to the sampling frequency is sufficiently attenuated by the filter.

Furthermore, in the embodiment, the analyzer 61 performs a periodic extension of the time series waveform data by using a predetermined window function and weighting the waveform in peripheries before and after the sampling time t1, when this moving average is performed. That is, the analyzer 61 performs a convolution process using the window function on the time series waveform (the time series waveform data). Furthermore, the analyzer 61 performs the frequency analysis on the time series waveform (the time series waveform data) on which the convolution process using the window function is performed.

Here, as the window function used in a general waveform analysis, a multiple kinds of window functions are known. With respect to this time series waveform data of the arc welding, a window function of a kind that corresponds to the welding condition when the arc welding work is performed is applied. In the illustrated example of the embodiment, the welding method is the short circuiting welding and the weld current is 250 A or more. According to these welding conditions, what is called a Gauss window is applied. In this window function called the Gauss window, as indicated with a thick solid line in the drawing illustrated in the leftmost side in FIG. 4, a value at the sampling time t1 becomes the maximum value of 1.0. With the sampling time t1 as a center, the values before and after the sampling time t1 are nonlinearly reduced. The analyzer 61 performs the data periodic extension process of the time series waveform data by performing an integration (weighting) of the weld current values (or the weld voltage values) and the values of the Gauss window at each time point (the convolution process using the Gauss window). That is, the analyzer 61 smoothes the time series waveform (the time series waveform data) in the peripheries before and after the sampling time t1 for a monocycle by the convolution process by weighting using the window function (the Gauss window). This causes the analyzer 61 to restrain a harmonic distortion that possibly occurs when a Fourier transformation (a time frequency analysis) is performed.

As illustrated in a drawing illustrated in the second from the left in FIG. 4, the analyzer 61 performs the frequency analysis using the Fourier transformation by FFT and the like on the waveform at the time t1 on which the data periodic extension process is performed. Furthermore, the analyzer 61 performs the convolution process using the Gauss window and the frequency analysis described above on the time series waveform data by shifting the time. Thus, the analyzer 61 performs the frequency analysis on the time series waveform data for each time (along the time domain). This causes the analyzer 61 to obtain the frequency spectral data for each time. The analyzer 61 overlays the obtained frequency spectral data for each time. That is, the analyzer 61 obtains the frequency spectral data as two-dimensional mapping data (a two-dimensional pixel row data) as illustrated in upper sides in respective FIGS. 2 and 3 described above by arranging the obtained frequency spectral data for each time along the time series as illustrated in the drawing in the rightmost side in FIG. 4. In the frequency spectral data illustrated in FIGS. 2 and 3, the horizontal axes indicate time axis (equivalent to a time domain) identical to the time series waveform data corresponding to respective frequency spectral data, and the vertical axes indicate frequency (equivalent to a frequency domain). Furthermore, shading at each point represents a spectrum density.

Figure 5:
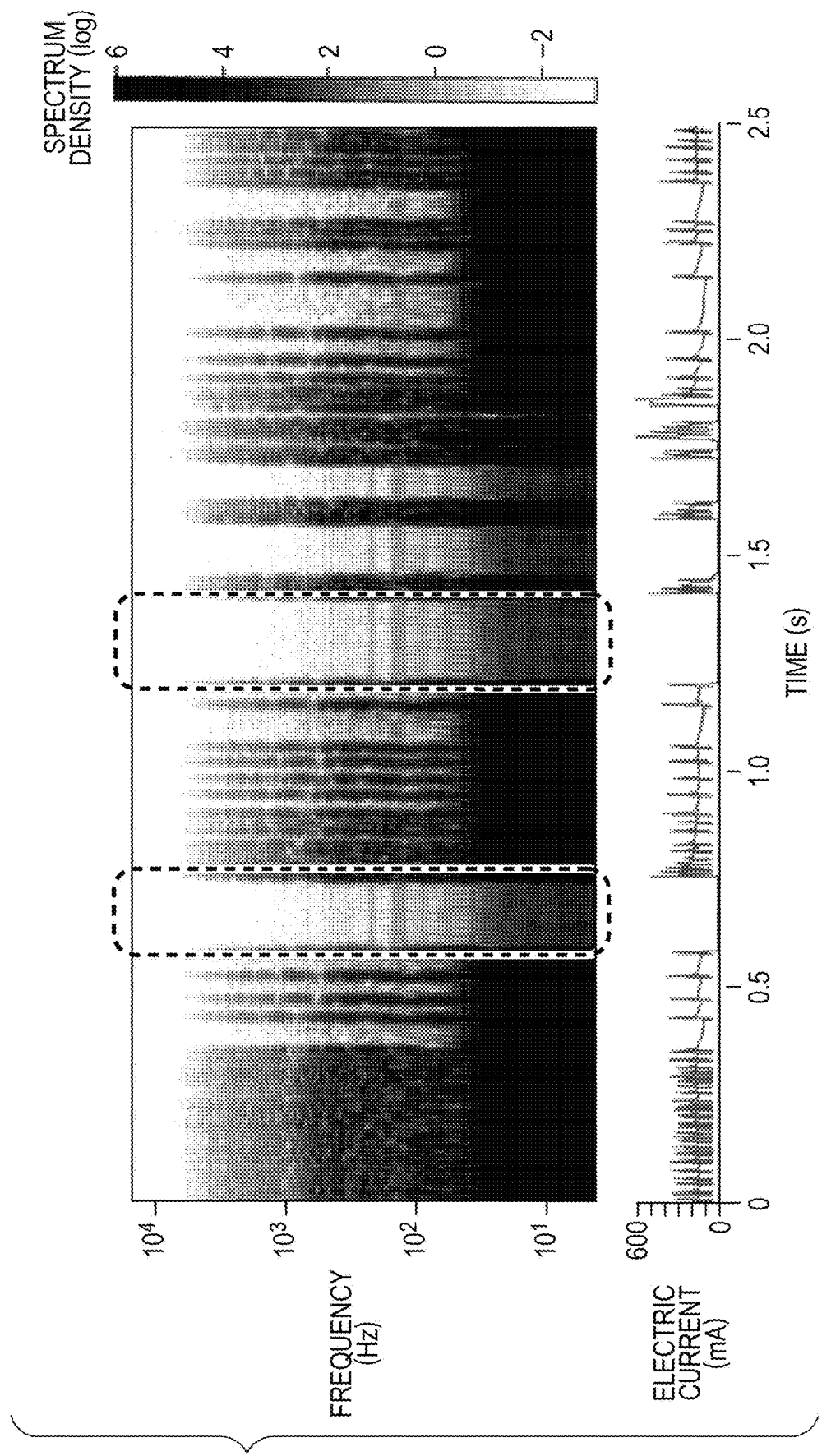
FIG. 5 illustrates an example of the time series waveform data and the frequency spectral data of the weld current when a weld crack failure occurs.
Figure 6:
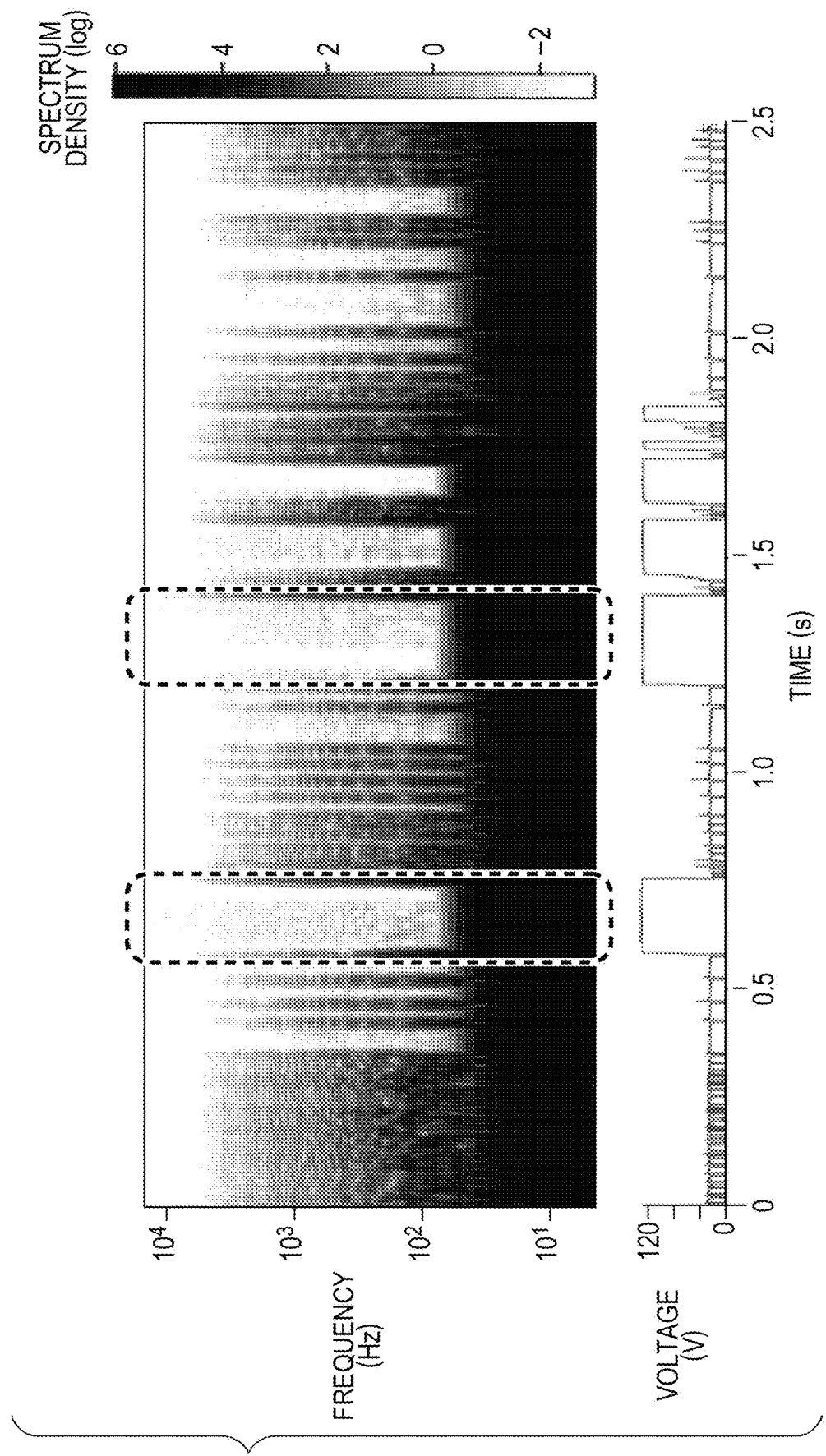
FIG. 6 illustrates an example of the time series waveform data and the frequency spectral data of the weld voltage when the weld crack failure occurs.
Figure 7:
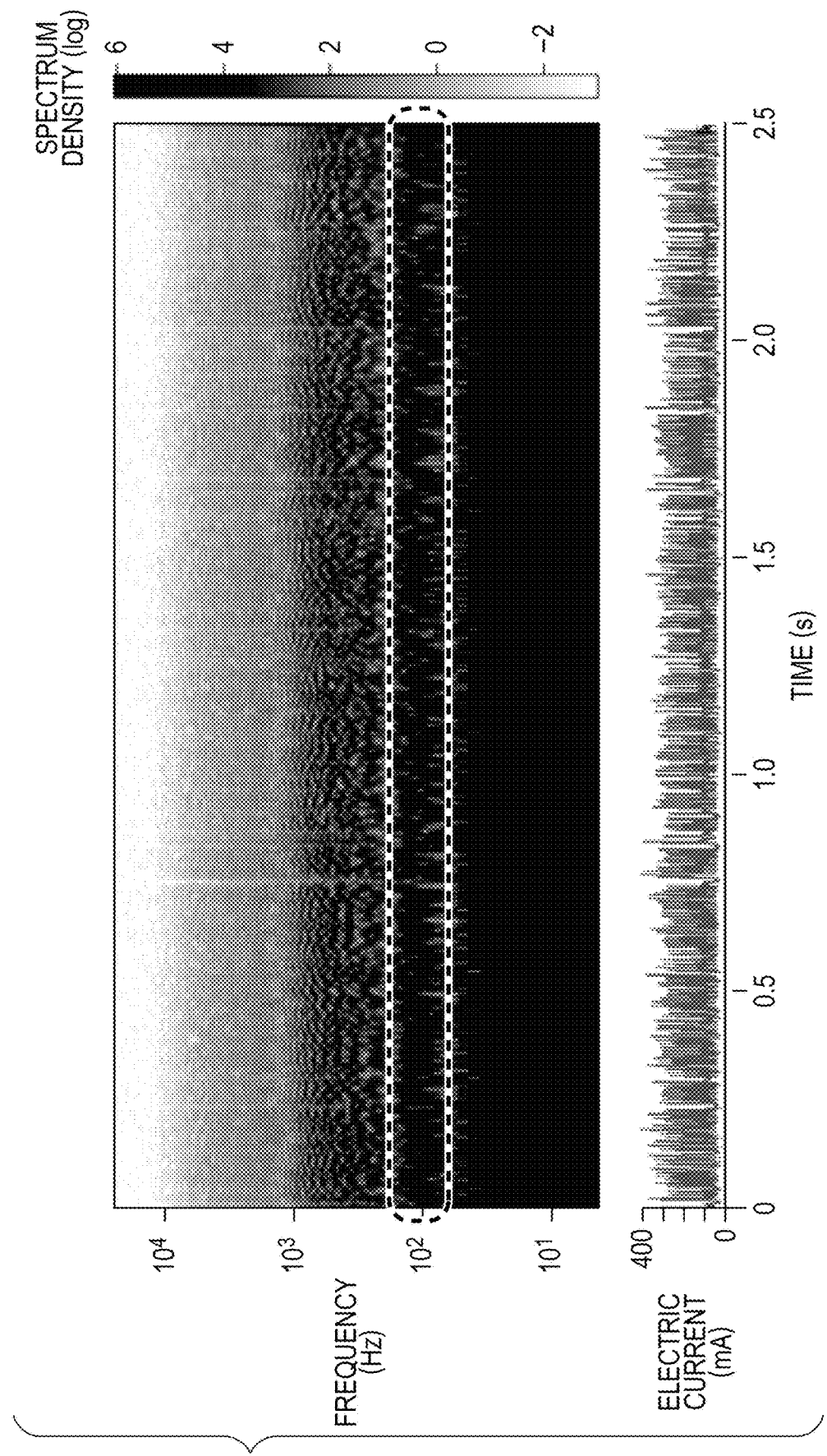
FIG. 7 illustrates an example of the time series waveform data and the frequency spectral data of the weld current when a no-gas failure occurs.
Figure 8:
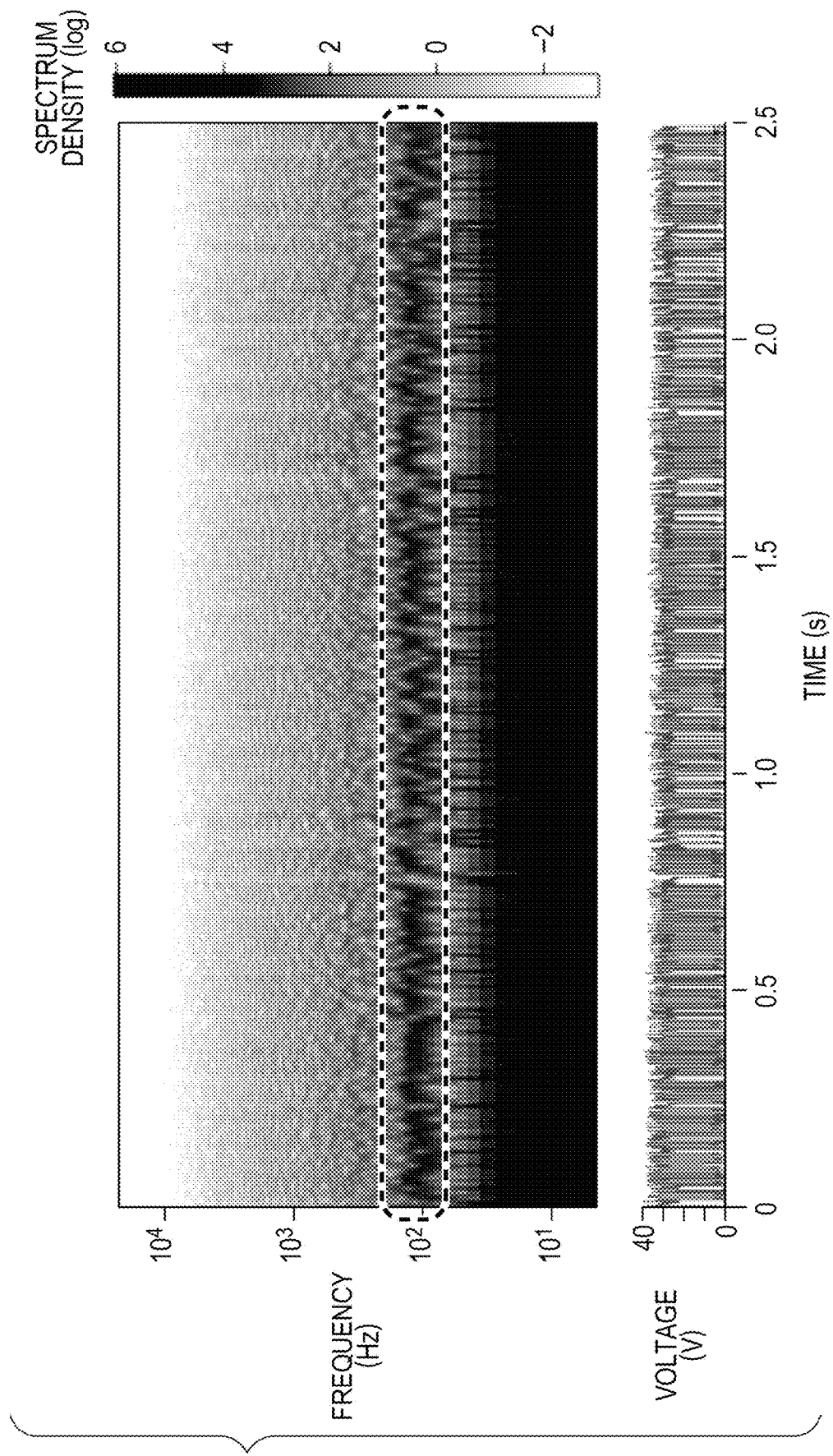
FIG. 8 illustrates an example of the time series waveform data and the frequency spectral data of the weld voltage when the no-gas failure occurs.

FIGS. 5 to 8 illustrate examples of the time series waveform data and the frequency spectral data obtained by the detection method and the analysis method described above when a weld crack failure or a no-gas failure occurs. FIG. 5 illustrates an example of the time series waveform data and the frequency spectral data of the weld current when what is called the weld crack failure in which a bead is cracked to cause a hole when the arc welding work is performed occurs (when the weld crack failure occurs). FIG. 6 illustrates an example of the time series waveform data and the frequency spectral data of the weld voltage when the weld crack failure occurs, similarly. FIG. 7 illustrates an example of the time series waveform data and the frequency spectral data of the weld current when what is called the no-gas failure in which the shield gas lacks when the arc welding work is performed occurs (when the no-gas failure occurs). FIG. 8 illustrates an example of the time series waveform data and the frequency spectral data of the weld voltage when the no-gas failure occurs, similarly.

<Regarding Determination Method by Determiner>

As can be seen from the respective frequency spectral data illustrated in FIGS. 2 and 3 described above and which correspond to when the normal welding is performed, in both the frequency spectral data, regarding the frequency region, the spectrum densities are comparatively high in the frequency domain of 0 to 140 Hz and the spectrum densities are gradually reduced in association with the increasing frequency in the bandwidth equal to or higher than 140 Hz. In both the frequency spectral data, it is understood that the frequency spectra hardly vary and are stable in the time domain.

In contrast to this, as can be seen from the frequency spectral data illustrated in FIGS. 5 and 6 and which correspond to when the weld crack failure occurs, in both the frequency spectral data, the frequency spectral data intermittently vary in the time domain, and when this variation occurs, the spectrum densities are significantly reduced (see dotted line frame portions in the respective drawings) over a whole frequency bandwidth compared with when the normal welding is performed. Thus, compared with when the normal welding is performed, the frequency spectral data generated when the weld crack failure occurs, it is recognized that there is a feature of an occurrence of a large variation in the time domain (the large variation occurs corresponding to a time variation).

Therefore, the determiner 62 in the example of the embodiment determines the occurrence of the weld crack failure by detecting the feature on this frequency spectral data. That is, the determiner 62 preliminarily stores the frequency spectral data (hereinafter referred to as normal frequency spectral data) when the normal welding is performed. The determiner 62 compares, regarding the time domain, this normal frequency spectral data with the frequency spectral data (hereinafter referred to as analysis frequency spectral data) generated by the analyzer 61 when the actual arc welding work is performed. This causes the determiner 62 to determine the welding state (the presence/absence of the weld crack failure). Specifically, for example, the determiner 62 may compare the analysis frequency spectral data with the corresponding normal frequency spectral data at each time point on the time domain. Furthermore, the determiner 62 may determine that the weld crack failure has occurred when detecting a state where a large difference is present between both data for a certain period of time or more. The following describes an example of a method for comparing the normal frequency spectral data with the analysis frequency spectral data at each time point. This method includes, for example, obtaining a correlation between the spectrum density waveforms over the whole frequency domain at each time point. Alternatively, this method includes comparing index values, such as average values or integrated values, of the spectrum densities over the whole frequency domain at each time point.

As can be seen from the respective frequency spectral data in FIGS. 7 and 8 that correspond to when the no-gas failure occurs, in both the frequency spectral data, the spectrum densities are comparatively large (see the dotted line frame portions in the respective drawings) compared with when the normal welding is performed in a certain frequency bandwidth (near $10^2$ Hz in the examples illustrated in the drawings) in the frequency domain. Thus, compared with when the normal welding is performed, in the frequency spectral data generated when the no-gas failure occurs, it is recognized that there is a feature of an occurrence of a large variation in the frequency domain (a difference with the frequency spectral data when the normal welding is performed becomes large in the frequency domain).

Therefore, the determiner 62 in the example of the embodiment determines the occurrence of the no-gas failure by detecting the feature on this frequency spectral data. That is, the determiner 62 compares, regarding the frequency region, the preliminarily stored normal frequency spectral data with the analysis frequency spectral data. This causes the determiner 62 to determine the welding state (the presence/absence of the no-gas failure). Specifically, for example, the determiner 62 may compare the analysis frequency spectral data with the corresponding normal frequency spectral data, regarding the above-described certain frequency bandwidth in the frequency domain. Furthermore, the determiner 62 may determine that the no-gas failure has occurred when detecting a state where a large difference is present between both data for a certain period of time or more. That is, the determiner 62 may obtain the welding state by comparing the analysis frequency spectral data with the normal frequency spectral data, regarding the frequency bandwidth that corresponds to the type of the weld failure in the frequency domain.

The following describes an example of a method for comparing the normal frequency spectral data with the analysis frequency spectral data in the certain frequency bandwidth. This method includes, for example, obtaining a correlation between the spectrum density waveforms in the frequency bandwidth at an arbitrary time point. This method includes comparing index values, such as average values or integrated values, of the spectrum densities in the frequency bandwidth at the arbitrary time point.

Although not specifically illustrated, some sort of features regarding any of the time domain or the frequency domain are expressed in the analysis frequency spectral data when other types of weld failures other than the weld crack failure and the no-gas failure described as the examples above occur. These features are expected to be expressed related to respective different time variation aspects and/or respective different frequency bandwidths. The determiner 62 becomes capable of determining the presence/absence of the weld failure for each type of the weld failure by detecting the features of the respective weld failures regarding each time variation aspect or frequency bandwidth.

Advantageous Effects with the Embodiment

As described above, the robot arc welding system 1 of the embodiment includes the analyzer 61 and the determiner 62. The analyzer 61 generates the frequency spectral data by performing the frequency analysis on the time series waveform of the weld voltage value or the weld current value detected by the weld power supply 5. The determiner 62 determines the welding state (for example, the presence/absence of the weld failure and/or the type of the occurred weld failure) of the welding work with the arc welding portion 41 based on the frequency spectral data generated by this analyzer 61. This ensures a phase analysis on the time series waveform of the weld voltage or the weld current. Specifically, the determiner 62 monitors the temporal variation of the frequency spectral data that relates to the weld failure in the frequency spectral data. This ensures discriminating noises from the frequency spectral data, thereby ensuring the high determination accuracy of the presence/absence of the weld failure (performance of obtaining the welding state). As a result, the performance of obtaining the welding state can be improved.

In examining the current technique, the inventors of the present disclosure have additionally perceived the following points. That is, the analyzer 61 obtains the frequency spectral data by performing the frequency analysis on the time series waveform processed by the convolution process using the window function. The determiner 62 can properly detect the feature of the waveform variation to especially be detected in the detection of various kinds of failures of the arc welding expressed in the obtained frequency spectral data. That is, it is found that the waveform analysis method that has been applied to human voiceprint analysis so far is especially appropriately applicable to the frequency analysis of the time series waveform of the weld voltage or the weld current when the arc welding work is performed. The embodiment performs the frequency analysis corresponding to a certain arc discharge monocycle with respect to the time series waveform detected in the arc welding based not only on the arc discharge monocycle. In the embodiment, the time series waveform is smoothed by weighting (the moving average) using the window function in the peripheral area of the time domain of the arc discharge monocycle. The frequency analysis is performed on the smoothed time series waveform. This ensures further improving the failure determination accuracy.

In the embodiment, the window function corresponding to the welding condition is specifically used. For example, the welding conditions, such as a kind of welding method (the short circuiting welding, pulse welding, and the like), a magnitude of the weld voltage, and a magnitude of the weld current, have a large influence on a droplet transferring state in the arc welding work. That is, these welding conditions have a large influence on the waveform of the time series waveform detected in the arc welding and a relationship between arc discharge cycles that continue in the time domain. Accordingly, using the window function appropriately selected corresponding to the welding condition ensures obtaining a satisfactory balance between a frequency resolution and a dynamic range in the frequency analysis. Therefore, the embodiment ensures improving the determination accuracy of the presence/absence of the weld failure even when the welding conditions are various.

In the example of the embodiment, the welding method is the short circuiting welding and the weld current is 250 A or more. Corresponding to these welding conditions, the Gauss window is applied as the window function. However, the window function is not limited to the Gauss window. Another example of the welding conditions includes a case where the welding method is the pulse welding and the like. There is also a case where the magnitude of the weld current and/or the weld voltage is different from the above-described example as the droplet transferring state changes. Appropriately applying the window function (not specifically illustrated) that corresponds to the welding condition ensures improving the failure determination accuracy.

In the embodiment, specifically, the determiner 62 determines the presence/absence of the weld failure by comparing the analysis frequency spectral data generated by the analyzer 61 with the normal frequency spectral data when the welding is normally performed. This ensures clearly determining the presence/absence of the weld failure by the relatively simple comparison process.

Among the weld failures, there are ones whose failure feature is clearly expressed in the frequency domain of the frequency spectral data. Therefore, in the embodiment, specifically, the determiner 62 determines the presence/absence of the weld failure by comparing the analysis frequency spectral data with the normal frequency spectral data regarding the frequency bandwidth corresponding to the weld failure (the no-gas failure and the like) of a predetermined type in the frequency domain. This enables the determiner 62 to determine the presence/absence of the weld failure while it clearly distinguishes the weld failures of a plurality of types in the embodiment. An unnecessary comparison process regarding the frequency bandwidth not related to the failure determination can be omitted.

Among the weld failures, there are ones whose failure feature is clearly expressed in the time domain of the frequency spectral data. Therefore, in the embodiment, specifically, the determiner 62 determines the presence/absence of the weld failure (the weld crack failure and the like) of a predetermined type by comparing the analysis frequency spectral data with the normal frequency spectral data in the time domain. This enables the determiner 62 to determine the presence/absence of the weld failure of such a type in the embodiment.

In the above-described embodiment, the analyzer 61 and the determiner 62 determine the presence/absence of the weld failure by comparison using the frequency spectral data that corresponds to any one (or both) of the weld current and the weld voltage by distinguishing them. Instead of this, the analyzer 61 may perform the frequency analysis on the time series waveform of any one of an impedance (voltage/electric current) and the weld electric power (voltage× electric current) obtained from the weld voltage and the weld current (not specifically illustrated). This enables the determiner 62 to perform a determination process based on both the weld voltage and the weld current all at once.

Modification

Various modifications may be made to the embodiment described above within the scope of the gist and the technical idea of the present disclosure.

First Modification: Case of Obtaining Welding State by Machine Learning

In the above-described embodiment, the determiner 62 determines the presence/absence of the weld failure by comparing the normal frequency spectral data with the analysis frequency spectral data. However, the determination method of the presence/absence of the weld failure is not limited to this. Other than that, the determiner 62 may determine the presence/absence of the weld failure by a determination method that uses machine learning. That is, the determiner 62 may obtain the welding state from the frequency spectral data based on the learned content in the machine learning process.

Figure 9:
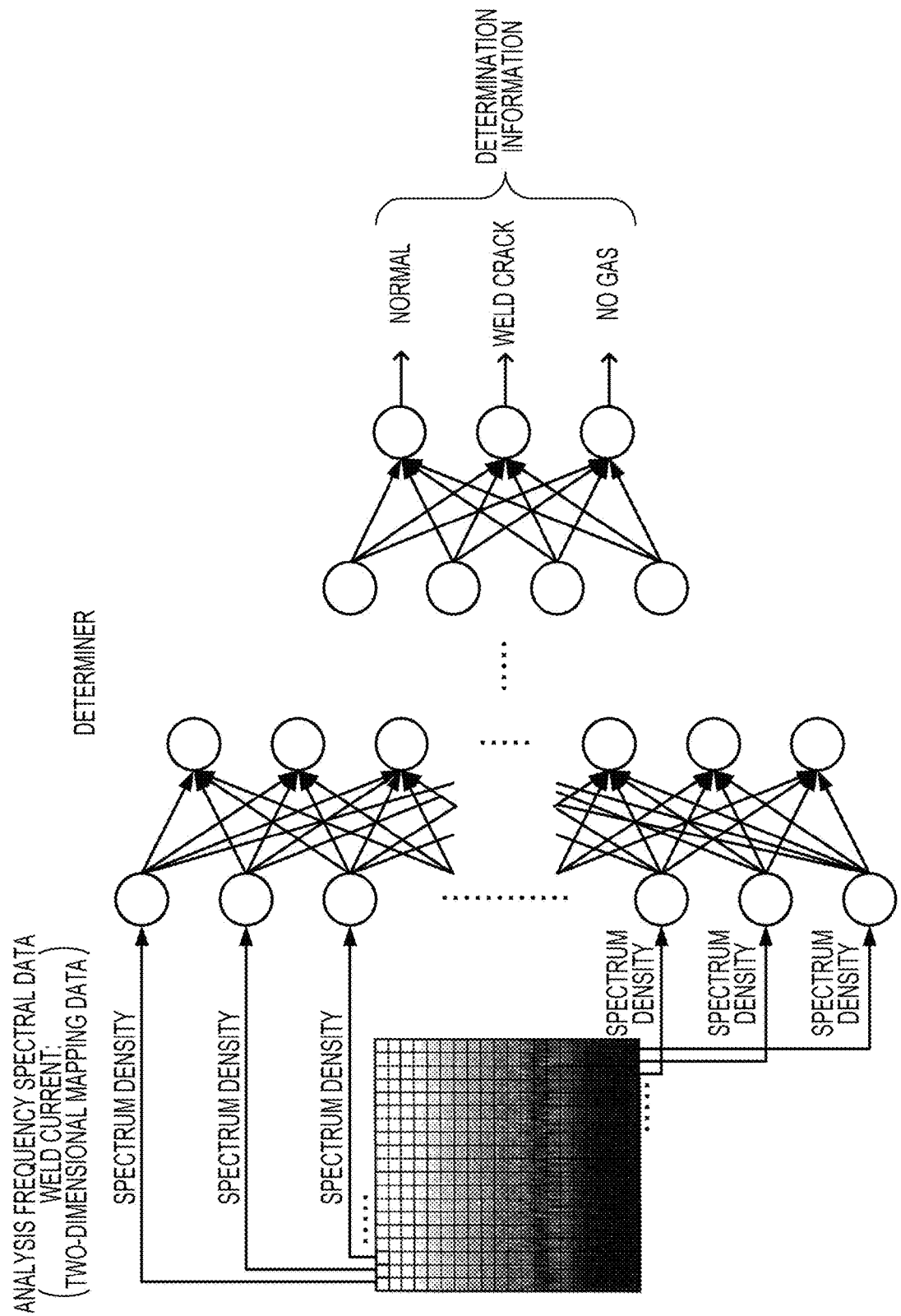
FIG. 9 illustrates an example of a summary model structure of a neural network of a determiner regarding a case where deep learning is applied to a machine learning algorithm.

A various machine learning method can be applied to the determination method of the determiner 62. The following describes a case of applying deep learning to a machine learning algorithm as one example. FIG. 9 illustrates an example of a summary model structure of a neural network of the determiner 62 regarding the case where the deep learning is applied to the machine learning algorithm. In this FIG. 9, the neural network of the determiner 62 is designed to obtain the presence/absence of the weld failure determinable from the feature expressed in the analysis frequency spectral data and the type of the weld failure regarding the analysis frequency spectral data as the two-dimensional mapping data input from the analyzer 61 and output the presence/absence of the weld failure and the type of the weld failure as weld information.

In the example illustrated in FIG. 9, the analysis frequency spectral data is input to an input node of the neural network of the determiner 62. In response to this, the determiner 62 outputs binary data as a true value (what is called a clustering output is performed) from any one of three output nodes that correspond to the respective welding states of no weld failure (normal), presence of a weld failure of weld crack, and presence of a weld failure of no gas. Regarding an input of the analysis frequency spectral data, spectrum densities (the shading in the drawing) at respective pixels are input into each of the input nodes as the two-dimensional mapping data that maintains a biaxial relationship between the time axis and the frequency axis of the analysis frequency spectral data. The determination process by the neural network of the determiner 62 is based on the learned content in the machine learning process in a learning phase of the determiner 62. That is, the neural network of this determiner 62 learns feature quantities that represent a correlation between a spectrum density pattern in both the time domain and the frequency domain of the analysis frequency spectral data and the welding state.

Figure 10:
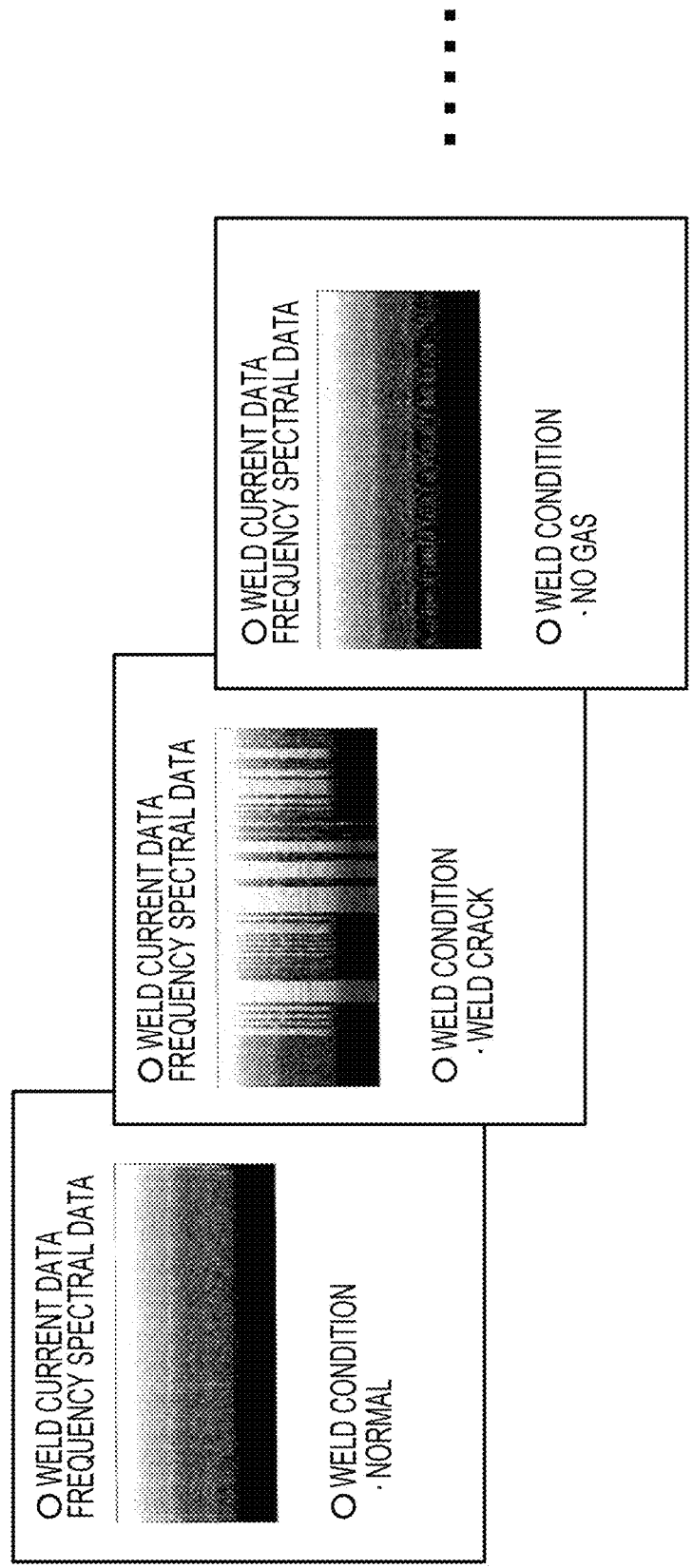
FIG. 10 illustrates data sets for learning used by the determiner.

Regarding this machine learning process of the determiner 62, a multi-layer neural network designed as described above is implemented by software (or by hardware) on the arc weld determination device 6. Then, the determiner 62 executes the learning by what is called the supervised learning, using many data sets for the determiner learning saved in a database not specifically illustrated. The data set for the determiner learning used here is, for example, as illustrated in FIG. 10, created as one data set for learning in which the actual welding state of the arc welding work and the frequency spectral data (based on the weld current in the illustrated example) obtained by this welding work are associated. Then, for the respective welding states, such data sets for learning are created in large numbers with various welding conditions and saved in the database.

In the learning phase of the determiner 62 in the example of the embodiment, teacher data that includes a combination of the frequency spectral data as input data and the welding state as output data is used. The determiner 62 performs the learning by a backpropagation process and the like, using this teacher data. In the backpropagation process, a weighting factor of an edge that couples each of the nodes is adjusted such that a relationship between an input layer and an output layer of the neural network of the determiner 62 is established. Process accuracy may be improved by using such a backpropagation process and known various learning methods, such as what is called an auto encoder, a Boltzmann machine with restriction, Dropout, adding noise, and a sparse regularization, in combination. The learning phase of this determiner 62 corresponds to one example of the machine learning process of the present disclosure.

As described above, the algorithm to obtain the welding state used by the determiner 62 may be other than the illustrated deep learning. This algorithm may be, for example, another pattern matching algorithm (not specifically illustrated) that uses a support vector machine, a Bayesian network, or the like. In such a case, a basic structure that an original welding state when the input analysis frequency spectral data is generated is obtained and output as the weld information is equal to a structure when the algorithm to which the deep learning is applied is used.

Advantageous Effects with First Modification

As described above, in the robot arc welding system 1 in this modification, the determiner 62 obtains the welding state based on the learned content in the machine learning process (the deep learning and other machine learnings). This enables the determiner 62 to determine the presence/absence of the weld failure based on the feature quantities of the weld failure obtained from the actual frequency spectral data machine-learned in the machine learning process not by the analysis method based on a mathematical model artificially designed. In view of this, the determiner 62 can improve the determination accuracy of the presence/absence of the weld failure (the performance of obtaining the welding state) by repeating the actual work.

In this modification, specifically, the determiner 62 learns a correspondence relationship between the feature quantities in both the time domain and the frequency domain of the input frequency spectral data and the welding state (the presence/absence of weld failure and the type of the weld failure) to be output in the machine learning process. This enables the determiner 62 to perform a pattern analysis on the frequency spectral data generated by the analyzer 61 as two-dimensional pattern data with the time domain and the frequency domain as orthogonal axes. The determiner 62 can perform the determination of the presence/absence of the weld failure for each type of the weld failures with high accuracy by detecting the feature quantities of the weld failure expressed in the two-dimensional pattern.

Second Modification: Case of Obtaining Welding State with Reference Also to Weld Wire Supply Speed A variation of a supply speed of the weld wire 43 as the filler has a large influence on the droplet transferring state in the arc welding work. This variation possibly largely changes a waveform shape of the time series waveform data. In view of this, the determiner 62 may obtain the welding state based on the frequency spectral data and the supply speed detected by the weld wire supply unit 42. FIG. 11 illustrates an example of a summary model structure of a neural network of the determiner 62 according to Second Modification. Deep learning is applied to this neural network. This neural network also takes the weld wire supply speed into consideration.

As illustrated in FIG. 11, the neural network of the determiner 62 is designed to obtain, as the welding state, the presence/absence of the weld failure and the type of the occurred weld failure corresponding to the analysis frequency spectral data input from the analyzer 61 and the weld wire supply speed and output as the weld information.

In the example illustrated in FIG. 11, the analysis frequency spectral data and the actually detected weld wire supply speed are input into the input node of the neural network of the determiner 62. In response to these, the determiner 62 outputs binary data as a true value (what is called clustering output is performed) from any one of four output nodes that correspond to the respective welding states of normal, presence of a weld failure of weld crack, presence of a weld failure of no gas, and presence of weld wire supply speed failure. Regarding an input of the weld wire supply speed, an average value of the supply speed detected in the time series identical to the frequency spectral data is input into the input node. Although not specifically illustrated, the input weld wire supply speed may be detected in the time series identical to the time series waveform data detected in the time series identical to the frequency spectral data. This neural network in the determiner 62 learns the feature quantities that represent correlation between the analysis frequency spectral data and the weld wire supply speed, and the welding state. In the learning phase in this case, although not specifically illustrated, a data set for learning in which the frequency spectral data and the weld wire supply speed, and the welding states of the actual arc welding work that correspond to these are associated is used. The determiner 62 may perform the learning by the backpropagation process and the like similar to the first modification using this data set for learning.

Advantageous Effects with Second Modification

As described above, in the robot arc welding system 1 of this modification, the arc welding portion 41 includes the weld wire supply unit 42 that supplies the weld wire 43. The determiner 62 obtains the welding state based also on the supply speed of the weld wire 43 by the weld wire supply unit 42. Thus, the determiner 62 obtaining the welding state based also on the supply speed of the weld wire 43 also ensures identifying a cause of the weld failure occurrence in addition to the type of the occurred weld failure. The determiner 62 may obtain the welding state by taking the supply state of the shield gas and the like into consideration other than the supply speed of the weld wire 43.

In the above description, when there are the expressions such as "vertical," "parallel," "plane," and the like, these expressions do not mean strictly "vertical," "parallel," "plane," and the like. That is, the expressions of these "vertical," "parallel," and "plane" allow the tolerance and the error on the design and manufacturing, and mean "substantially vertical," "substantially parallel," and "substantially plane," respectively.

In the above description, when there are the expressions such as "identical," "same," "equal," "different," and the like about the dimension, the size, the shape, the position, and the like on appearance of a member, these expressions do not mean strictly "identical," "same," "equal," "different, " and the like. That is, the expressions of these "identical," "same," "equal," and "different" allow the tolerance and the error on the design and manufacturing, and mean "substantially identical," "substantially same," "substantially equal," and "substantially different," respectively.

Other than the above description, the above embodiment and methods in each of the modifications may be combined for use as necessary. Otherwise, while specific examples are omitted, various modifications may be made to the above embodiment and each of the modifications to perform within the scope of the gist of the technique of the present disclosure.

The embodiment of the present disclosure may be the following first to tenth arc welding systems and first arc weld determination device.

The first arc welding system includes a robot, an arc welding portion that is transportably mounted on the robot and executes an arc welding, an arc welding power supply that supplies a predetermined weld voltage and weld current to the arc welding portion, an analyzer that generates frequency spectral data by performing a frequency analysis on a time series waveform of at least one of the weld voltage and the weld current, and a determiner that determines a welding state by the arc welding portion based on the frequency spectral data generated by the analyzer.

In the second arc welding system according to the first arc welding system, the analyzer performs a frequency analysis on each of the time series waveforms processed by a convolution process using a window function.

In the third arc welding system according to the second arc welding system, for the window function, a window function corresponding to a welding condition is used.

In the fourth arc welding system according to the second or third arc welding system, the determiner determines by comparing analysis frequency spectral data generated by the analyzer with normal frequency spectral data when the welding state is normal.

In the fifth arc welding system according to the fourth arc welding system, the determiner determines a presence/absence of a failure of a predetermined failure type by comparing the analysis frequency spectral data with the normal frequency spectral data in a frequency bandwidth that corresponds to the failure type in a frequency domain.

In the sixth arc welding system according to the fourth or fifth arc welding system, the determiner determines a presence/absence of a failure of a predetermined failure type by comparing the analysis frequency spectral data with the normal frequency spectral data in a time domain.

In the seventh arc welding system according to the second or third arc welding system, the determiner determines the welding state based on a learned content in a machine learning process.

In the eighth arc welding system according to the seventh arc welding system, the determiner learns a correspondence relationship between feature quantities in both a time domain and a frequency domain of received frequency spectral data and a presence/absence of a failure of a failure type to be output in the machine learning process.

In the ninth arc welding system according to any one of the first to eighth arc welding systems, the analyzer performs a frequency analysis on a time series waveform of any one of an impedance and a weld electric power obtained from the weld voltage and the weld current.

In the tenth arc welding system according to any one of the first to ninth arc welding systems, the arc welding portion includes a filler supply unit that supplies a filler, and the determiner determines the welding state based on a supply speed of the filler by the filler supply unit.

The first arc weld determination device includes an analyzer that generates frequency spectral data by performing a frequency analysis on a time series waveform of a weld voltage or a weld current detected from an external arc welding power supply, and a determiner that determines a presence/absence of a failure of a failure type that corresponds to feature quantities included in the frequency spectral data in both a time domain and a frequency domain based on a learned content in the machine learning process.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An arc welding system, comprising:
an arc welding portion that executes an arc welding;
an arc welding power supply that supplies a weld voltage and a weld current to the arc welding portion;
an analyzer comprising analyzer circuitry configured to perform a frequency analysis on a time series waveform of at least one of the weld voltage and the weld current and generate frequency spectral data; and a determiner comprising determiner circuitry configured to obtain a welding state of a welding work by the arc welding portion based on comparing the frequency spectral data generated by the analyzer against previously generated frequency spectral data.

2. The arc welding system according to claim 1, wherein the analyzer circuitry of the analyzer is configured to perform the frequency analysis on the time series waveform processed by a convolution process using a window function.

3. The arc welding system according to claim 2, wherein the welding state includes at least one of a presence/absence of a weld failure and a type of an occurred weld failure.

4. The arc welding system according to claim 2, further comprising:

a robot on which the arc welding portion is transportably mounted.

5. The arc welding system according to claim 2, wherein the analyzer circuitry of the analyzer is configured to use the window function that corresponds to a welding condition.

6. The arc welding system according to claim 2, wherein the determiner circuitry of the determiner is configured to compare analysis frequency spectral data with normal frequency spectral data, which is the previously generated frequency spectral data, to obtain the welding state, the analysis frequency spectral data are the frequency spectral data generated by the analyzer circuitry of the analyzer, and the normal frequency spectral data are frequency spectral data obtained when a normal welding is performed.

7. The arc welding system according to claim 6, wherein the determiner circuitry of the determiner is configured to compare the analysis frequency spectral data with the normal frequency spectral data for a frequency domain to obtain the welding state.

8. The arc welding system according to claim 7, wherein the determiner circuitry of the determiner is configured to compare the analysis frequency spectral data with the normal frequency spectral data for a frequency bandwidth that corresponds to a type of a weld failure in a frequency domain to obtain the welding state.

9. The arc welding system according to claim 6, wherein the determiner circuitry of the determiner is configured to compare the analysis frequency spectral data with the normal frequency spectral data for a time domain to obtain the welding state.

10. The arc welding system according to claim 2, wherein the determiner circuitry of the determiner is configured to obtain the welding state from the frequency spectral data based on a learned content in a machine learning process.

11. The arc welding system according to claim 10, wherein the determiner circuitry of the determiner is configured to receive the frequency spectral data and output the welding state obtained based on the frequency spectral data, and the determiner circuitry of the determiner is configured to learn a correspondence relationship between feature quantities in both a time domain and a frequency domain of the received frequency spectral data and a welding state to be output in the machine learning process.

12. The arc welding system according to claim 1, wherein the analyzer circuitry of the analyzer is configured to perform the frequency analysis on a time series waveform of one of impedance and a weld electric power obtained from the weld voltage and the weld current.

13. The arc welding system according to claim 12, wherein the welding state includes at least one of a presence/absence of a weld failure and a type of an occurred weld failure.

14. The arc welding system according to claim 1, wherein the arc welding portion includes a filler supply unit that supplies a filler, and the determiner circuitry of the determiner is configured to obtain the welding state based on the frequency spectral data and a supply speed of the filler supplied by the filler supply unit.

15. The arc welding system according to claim 1, wherein the welding state includes at least one of a presence/absence of a weld failure and a type of an occurred weld failure.

16. The arc welding system according to claim 1, further comprising:

a robot on which the arc welding portion is transportably mounted.

17. An arc weld determination device, comprising:

an analyzer comprising analyzer circuitry configured to perform a frequency analysis on a time series waveform of at least one of a weld voltage for an arc welding and a weld current for the arc welding and generate frequency spectral data; and a determiner comprising determiner circuitry configured to obtain a welding state of the arc welding based on comparing the frequency spectral data generated by the analyzer circuitry of the analyzer against previously generated frequency spectral data.

18. An arc weld determination device, comprising:

an analyzer comprising analyzer circuitry configured to perform a frequency analysis on a time series waveform of at least one of a weld voltage for an arc welding and a weld current for the arc welding and generate frequency spectral data; and a determiner comprising determiner circuitry configured to obtain a welding state of the arc welding based on the frequency spectral data generated by the analyzer circuitry of the analyzer, wherein the determiner circuitry of the determiner configured to obtain the welding state from the frequency spectral data based on a learned content in a machine learning process.

19. The arc weld determination device according to claim 18, wherein the determiner circuitry of the determiner is configured to receive the frequency spectral data and output the welding state obtained based on the frequency spectral data, and the determiner circuitry of the determiner is configured to learn a correspondence relationship between feature quantities in a time domain and a frequency domain of the received frequency spectral data and a welding state to be output in the machine learning process.

20. An arc weld determination device, comprising:

means for performing a frequency analysis on a time series waveform of at least one of a weld voltage for an arc welding and a weld current for the arc welding and generating frequency spectral data; and means for obtaining a welding state of the arc welding based on comparing the frequency spectral data against previously generated frequency spectral data.

* * * * *